(12) United States Patent
DeWeert et al.

(10) Patent No.: US 11,719,822 B2
(45) Date of Patent: Aug. 8, 2023

(54) SYSTEM AND METHOD FOR GENERATING THREE-DIMENSIONAL IMAGERY

(71) Applicant: BAE Systems Information and Electronic Systems Integration Inc., Nashua, NH (US)

(72) Inventors: Michael J. DeWeert, Kaneohe, HI (US); Brian Chock, Honolulu, HI (US); Jacob D. Garan, Honolulu, HI (US); Reid A. Noguchi, Honolulu, HI (US); Gary Sawai, Wahiawa, HI (US); Dugan C. Yoon, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 167 days.

(21) Appl. No.: 17/366,225

(22) Filed: Jul. 2, 2021

(65) Prior Publication Data
US 2023/0003889 A1    Jan. 5, 2023

(51) Int. Cl.
*G01S 17/89*    (2020.01)
*G06T 17/05*    (2011.01)
*G01S 7/484*    (2006.01)
*G01S 17/58*    (2006.01)

(52) U.S. Cl.
CPC .............. *G01S 17/89* (2013.01); *G01S 7/484* (2013.01); *G01S 17/58* (2013.01); *G06T 17/05* (2013.01)

(58) Field of Classification Search
CPC .......... G01S 17/89; G01S 17/58; G01S 7/484; G01S 17/05; G06T 17/05
See application file for complete search history.

(56) References Cited

U.S. PATENT DOCUMENTS

| | | | |
|---|---|---|---|
| 5,696,577 A | 12/1997 | Stettner et al. | |
| 6,157,756 A * | 12/2000 | Ishiwata | G02B 6/2848 385/115 |
| 6,823,001 B1 * | 11/2004 | Chea | H04L 5/16 375/220 |
| 7,315,583 B2 * | 1/2008 | Joo | H04L 49/9042 710/22 |
| 7,864,305 B2 * | 1/2011 | Dabiri | G01P 5/001 356/28 |

(Continued)

OTHER PUBLICATIONS

U.S. Appl. No. 16/885,739, filed May 28, 2020, DeWeert, et al.

(Continued)

*Primary Examiner* — Gregory M Desire
(74) *Attorney, Agent, or Firm* — Sand, Sebolt & Wernow LPA; Gary McFaline

(57) ABSTRACT

An underwater imaging system is carried by a submersible platform to capture images that are processed into three-dimensional images stitched together to create a 3D dimensional video at video rate speeds that are transmitted to a control unit above the surface of the water. The imaging system utilizes a high speed image sensor or camera to capture sequential gated images that are synced via a gating module to two sequential laser beam pulses. The laser beam pulses illuminate an object in each gated image. When the object is within a gate overlap region, the two images may be processed using 3D imaging techniques to generate a 3D representation of the object in the overlap region of the two gates.

18 Claims, 8 Drawing Sheets

(56) References Cited

U.S. PATENT DOCUMENTS

| | | | |
|---|---|---|---|
| 8,035,083 B1* | 10/2011 | Kozlov | G01J 3/108 |
| | | | 250/341.1 |
| 10,116,841 B2* | 10/2018 | Boyle | G06F 16/5866 |
| 10,782,311 B2* | 9/2020 | Heidrich | G01P 5/001 |
| 10,785,384 B2* | 9/2020 | Hung | H04N 23/63 |
| 10,895,843 B2* | 1/2021 | Hong | G03H 1/0443 |
| 10,930,013 B2 | 2/2021 | Boyle et al. | |
| 11,047,873 B2* | 6/2021 | Calantoni | G06T 7/292 |
| 2007/0035264 A1* | 2/2007 | Gunton | E05F 15/41 |
| | | | 318/400.29 |
| 2014/0285655 A1* | 9/2014 | Son | A61B 5/1075 |
| | | | 600/407 |
| 2017/0372602 A1 | 12/2017 | Gilliland et al. | |
| 2019/0056498 A1 | 2/2019 | Sonn et al. | |
| 2019/0127034 A1 | 5/2019 | Larson et al. | |
| 2019/0226834 A1* | 7/2019 | Lundquist | G01S 7/4814 |
| 2020/0348414 A1 | 11/2020 | Donly et al. | |
| 2021/0037229 A1 | 2/2021 | Pinto et al. | |
| 2021/0086884 A1 | 3/2021 | Jongsma et al. | |
| 2021/0302555 A1 | 9/2021 | DeWeert | |

OTHER PUBLICATIONS

DeWeerts, Detection of Underwater Military Munitions by Synoptic Airborne Multi-Sensor System, SERDP, Jul. 2010.
International Search Report, PCT/US22/35265, dated Oct. 5, 2022, 8 pages.

* cited by examiner

SYSTEM AND METHOD FOR GENERATING THREE-DIMENSIONAL IMAGERY

TECHNICAL FIELD

The present disclosure relates to the generation of three-dimensional imagery. More particularly, the present disclosure relates to a system for generating three-dimensional imagery in underwater environments at video rates.

BACKGROUND

The ability to detect objects underwater is exceedingly difficult due to the varied environmental conditions encountered. Despite the difficulty, there are numerous applications where underwater imagery is beneficial in both commercial and military applications. Some examples include locating sunken vessels, monitoring underwater pipes and cables, inspecting the hull or propeller of a vessel, or analyzing underwater structures such as oil rigs or maritime wind turbines.

By way of further illustration, many active and former military installations have ranges and training areas that include adjacent water environments such as ponds, lakes, rivers, estuaries, and coastal ocean areas. Most munitions operate properly, but historical records indicate that up to 10% of all munitions fail to detonate as designed. Due to the technical challenges created by the water medium, unexploded ordinance (UXO) detection technologies and, therefore, the cleanup of these sites have lagged technologies and cleanup on land, especially with respect to ordnance buried beneath the seabed. Although difficult, cleanup of underwater sites is among DoD priorities for environmental programs.

Ordnance can take many forms but is often artillery shells that are buried to varying depths beneath the seabed. Underwater UXO sites may consist of various water salinity/depths and bottom compositions, littered with buried and unburied unexploded ordnance as well as debris fields arrayed according to patterns that developed by the long term use of the training sites (target areas, extent of flight, etc.). In deeper water, most UXO will be found on the bottom or buried just below the seabed, where the bottom is composed of deep layers of mud or fine silt, gravitational burial may be expected. Where the seafloor has little sediment, the UXOs are often bio-fouled with corals and algae, making them appear similar in color to the bottom.

Typical ordnance at underwater sites can take many shapes and sizes, and reside in a variety of environmental conditions. Ordnance landing in shallow water may bury on impact to varying depths, depending on angle of impact; soil type; speed of aircraft and impact; height of release and shape. In deeper water most UXO will be found on the bottom or buried just below the seabed due to scouring effects caused by hydraulic forces. Where the bottom is composed of deep layers of mud or fine silt, gravitational burial may be expected. In many cases, burial can be modeled and predicted with some accuracy using tools such as the "adapted" VORTEX model and that knowledge exploited. Underwater sites, therefore, may consist of various water salinity, depths and bottom compositions, littered with buried and unburied unexploded ordnance as well as debris fields arrayed according to patterns that developed by the long term use of the training sites (target areas, extent of flight, etc.).

In addition to identifying and manipulating UXO, there are other missions for which 3D underwater imaging is beneficial. These include, but are not limited to: undersea pipeline and cable assessment and repair, ship-hull inspection, underwater structure inspection, underwater archaeology, and identification of navigational hazards.

SUMMARY

What is needed is a fast, efficient means for detecting and inspecting underwater structures and objects of interest amongst other objects or targets that need to be detected. In one aspect, an exemplary embodiment of the present disclosure may provide technology to accomplish precise three dimensional (3D) imaging both in air and underwater, day and night. The system can provide millimeter-scale range resolution across a wide field with high spatial resolution, and is able to accomplish the same in the perpetual darkness of the deep ocean. The present disclosure overcomes some of the previous challenges and drawbacks associated with other methods: point-cloud lidar systems that are too slow, stereo imaging methods that are too computationally onerous (due to solving the image correspondence problem for scatter-blurred images), and other LIDAR offerings that are too immature. Lidar refers to laser imaging, detection, and ranging. In one embodiment of the present disclosure, a Large-field, In-water Video for Enhanced Situational-awareness with Imagery Generated in High-resolution, Three-dimensional (LIVESIGHT) system uses laser light at water-penetrating wavelengths and a single imaging aperture to eliminate the correspondence problem. The present system can provide a 3-dimensional imaging capability to support robotic manipulation of threat objects, UXO, or other items of interest from a (potentially moving/drifting) unmanned underwater system (UUS). In one example the present system can provide imaging in a 720p or denser video format over a field of view of 50 degrees×80 degrees, with millimeter-scale range resolution, over a 0.5-1 meter depth of field, at depths of up to 1000 feet. The 3D images are rendered at a rate of 10 Hz or faster at full pixel density, with latency<0.1 seconds.

In addition to undersea applications, the method of this disclosure can be applied to through-air or through-vacuum 3D imaging where more-conventional methods may not be available or precise enough.

In one or more exemplary embodiments of the present disclosure, the present system can: 1. Use a single camera, so the system is not susceptible to the video-correspondence problem of parallax-based stereo imaging, where the correspondence problem is especially problematic in the ocean scattering medium, where edges appear blurred. 2. Use laser illumination, so the system can operate in the 24/7 darkness of the deep ocean; 3. Capture the entire image with just two laser shots acquired over microseconds, and render 3D imagery very quickly. This makes it far superior to point-cloud LIDARs that require many laser shots to build up a 3D image, impractical for low-latency mega-pixel imaging at 10 Hz or faster. 4. Acquire images quickly to make 3D imaging robust versus system pitch, roll, yaw, and drift. This is important, due to limitations of underwater station keeping from a compact UUS. 5. Conventional timed Lidars would need picosecond time resolution to achieve mm-scale range resolution, requiring acquiring many frames with picosecond timing. The system of the present disclosure can provide mm-scale range resolution with nanosecond timing, a thousand times slower (and easier/cheaper).

According to the present disclosure the imaging system and method offers the potential for observing the shape of objects or other targets on the bottom (or in another location in the water column), indicators of the objects such as scour pits, and bottom features. Because the present system is implemented with a range-gated ICMOS (Intensified CMOS) camera, the large array size (e.g.: 1024×773) provides detailed information on the 3D shape of objects. However, other range-gated technologies, such as ICCD (Intensified CCD cameras) would also work as imaging sensors. The imaging resolution capability and range maps are insensitive to non-uniform target reflectance and inhomogeneity of the illumination source, though very dark objects yield noisy range images. In one example, objects are clearly defined in the imagery that would not be distinguishable in a conventional Lidar approach. This is because for a conventional imaging Lidar to achieve similar range resolution would require digitization at a sampling rate exceeding 10 GHz, beyond the capabilities of current technology.

In one aspect of an embodiment, the present system employs a range-gated Lidar, which registers all pixels simultaneously, thereby reducing image distortion, minimizing software complexity, and improving energy efficiency, enabling deeper penetration. The present technique collects fine-resolution imagery in all three spatial dimensions without requiring high-speed temporal sampling (GHz or faster). The distances are computed from pairs of range-gated Lidar returns collected with gates much wider than the size of the object being imaged. Despite the thickness of the range gates, the present system achieves precise range resolution by exploiting the temporal shape of the gated-imager response—the way the gates ramp up and down as the camera is turned on and off in synchrony with the laser pulse, using the nonlinear shape r(t) of the response curve. The gating response curve is due to the combined effects of the laser temporal pulse shape and the Lidar receiver on/off switching and time constants. A pair of images collected to place the target at different places on the response curve is processed to separate reflectance from range and render an image of ranges to target across the entire image.

In another aspect, an exemplary embodiment of the present disclosure may provide an underwater imaging system comprising: a submersible platform; a first laser source to generate a first laser beam pulse, and a second laser beam pulse generated by one of (i) the first laser source and (ii) a second laser source; wherein the laser source is carried by the submersible platform and the first and second laser beams are generated when the submersible platform is underwater; a gating module in operative communication with the laser source to create a first gate and a second gate, wherein the first gate overlaps the second gate to define an overlap region; an image sensor in operative communication with the gating module to capture a first image at the first gate and a second image at the second gate; a processor to determine whether an object illuminated by one or both of the first laser beam pulse and the second laser beam pulse is within the overlap region and generate a three dimensional (3D) representation of the object in the overlap region. This exemplary embodiment or another exemplary embodiment may provide wherein the image sensor is a particle image velocimetry camera. This exemplary embodiment or another exemplary embodiment may provide wherein the gating module effectuates sequential transmission the first laser beam pulse and the second laser beam pulse for the image sensor to capture the first image at the first gate and the second image at the second gate; wherein the first and second images are at the two different times. This exemplary embodiment or another exemplary embodiment may provide a pulse differential period, wherein the first laser beam pulse is transmitted at a first time in the pulse differential period and the second laser beam pulse is transmitted at a second time in the pulse differential period, wherein the pulse differential period is in a range from 1 microsecond to about 10 microseconds. This exemplary embodiment or another exemplary embodiment may provide a gated operative connection of the image sensor to the first laser source and the source of the second laser beam pulse that is configured to frame when the first laser source transmits the first laser beam pulses and frames again when the second laser beam pulse is transmitted.

This exemplary embodiment or another exemplary embodiment may provide a transmission rate of the 3D representation of the object from the processor, wherein the transmission rate is in a range from 1 Mbps to about 12 Mbps. This exemplary embodiment or another exemplary embodiment may provide a first gate distance from 1 m to 3 m from the image sensor; and a second gate distance from 2 m to 4 m from the image sensor; wherein the overlap region is from 2 m to 3 m from the image sensor. These ranges are exemplary, but the technology is not limited to these ranges. With proper selection of laser pulse and camera gate durations, other ranges are possible. This exemplary embodiment or another exemplary embodiment may provide 3D imaging logic to generate a 3D representation in a video stream at a video data rate based on the high-speed capture of images from the image sensor.

This exemplary embodiment or another exemplary embodiment may provide a field of view for the image sensor that is greater than 45 degrees. This exemplary embodiment or another exemplary embodiment may provide wherein the field of view for the image sensor is about 80 degrees. This exemplary embodiment or another exemplary embodiment may provide a hemispherical dome having a radius of curvature that centers an effective focal plane on an effective origin of the first and second laser beam pulses to not distort the first and second laser beam pulses or the image sensor.

This exemplary embodiment or another exemplary embodiment may provide a tether from the submersible platform to a control unit located above a surface of water; wherein the processor is on the submersible platform to transmit the 3D representation to the control unit over the tether at a video data rate. This exemplary embodiment or another exemplary embodiment may provide an image intensifier coupled to the image sensor, wherein the image intensifier is in electrical communication with the gating module to control exposure time of the image sensor, wherein operation of the image intensifier to control exposure time of the sensor is independent from a different exposure control within the image sensor.

This exemplary embodiment or another exemplary embodiment may provide relay optics that define couplings to couple the image intensifier with a focal plane array of the image sensor. This exemplary embodiment or another exemplary embodiment may provide wherein the relay optics are a 1:1 coupling for the image intensifier to the image sensor. The relay optics provide a coupling to match the image intensifier output size to the focal plane array dimensions. The coupling may be 1:1, or it may be >1:1 if the image intensifier output is larger than the focal plane, or it may be <1:1 if the image intensifier is smaller than the focal plane.

This exemplary embodiment or another exemplary embodiment may provide a beam former carried by the submersible platform, wherein the first laser beam and the second laser beam sequentially exit the submersible platform through the beam former.

In yet another aspect, an exemplary embodiment of the present disclosure may provide an underwater imaging system which is carried by a submersible platform to capture images that are processed into three-dimensional images stitched together to create a 3D dimensional video at video rate speeds that are transmitted to a control unit above the surface of the water. The imaging system utilizes a high speed image sensor or camera to capture sequential gated images that are synced via a gating module to two sequential laser beam pulses. The laser beam pulses illuminate an object in each gated image. When the object is within a gate overlap region, the two images may be processed using 3D imaging techniques to generate a 3D representation of the object in the overlap region of the two gates.

In another embodiment, an exemplary aspect of the present disclosure may include a method comprising: submerging a platform carrying at least one laser source and at least one image sensor; generating a first laser beam pulse and generating a second laser beam pulse; emitting the first laser beam pulse and emitting the second laser beam pulse after the first laser beam pulse; gating, via a gating module, the image sensor to capture a first image of the first laser beam pulse at a first gate; gating, via the gating module, the image sensor to capture a second image of the second laser beam pulse at a second gate; wherein the second gate and the first gate define an overlap region; and creating a three dimensional (3D) representation of an object within the overlap region by processing the first image and the second image. This exemplary embodiment or another exemplary embodiment may further include wherein the image sensor is a particle image velocimetry (PIV) camera; and sequentially transmitting, via instructions from the gating module, the first laser beam pulse and the second laser beam pulse for the PIV to capture the first image at the first gate and the second image at the second gate; wherein the first and second images are at the two different times This exemplary embodiment or another exemplary embodiment may further include defining a laser beam pulse differential period in a range from 1 microsecond to about 10 microseconds, wherein the first laser beam pulse is transmitted at a first time in the pulse differential period and the second laser beam pulse is transmitted at a second time in the pulse differential period. This exemplary embodiment or another exemplary embodiment may further include transmitting the 3D representation of the object at a transmission rate in a range from 1 Mbps to about 12 Mbps from a processor on the submersible platform to a control unit, wherein the control unit is remotely connected to the submersible platform via a tether.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
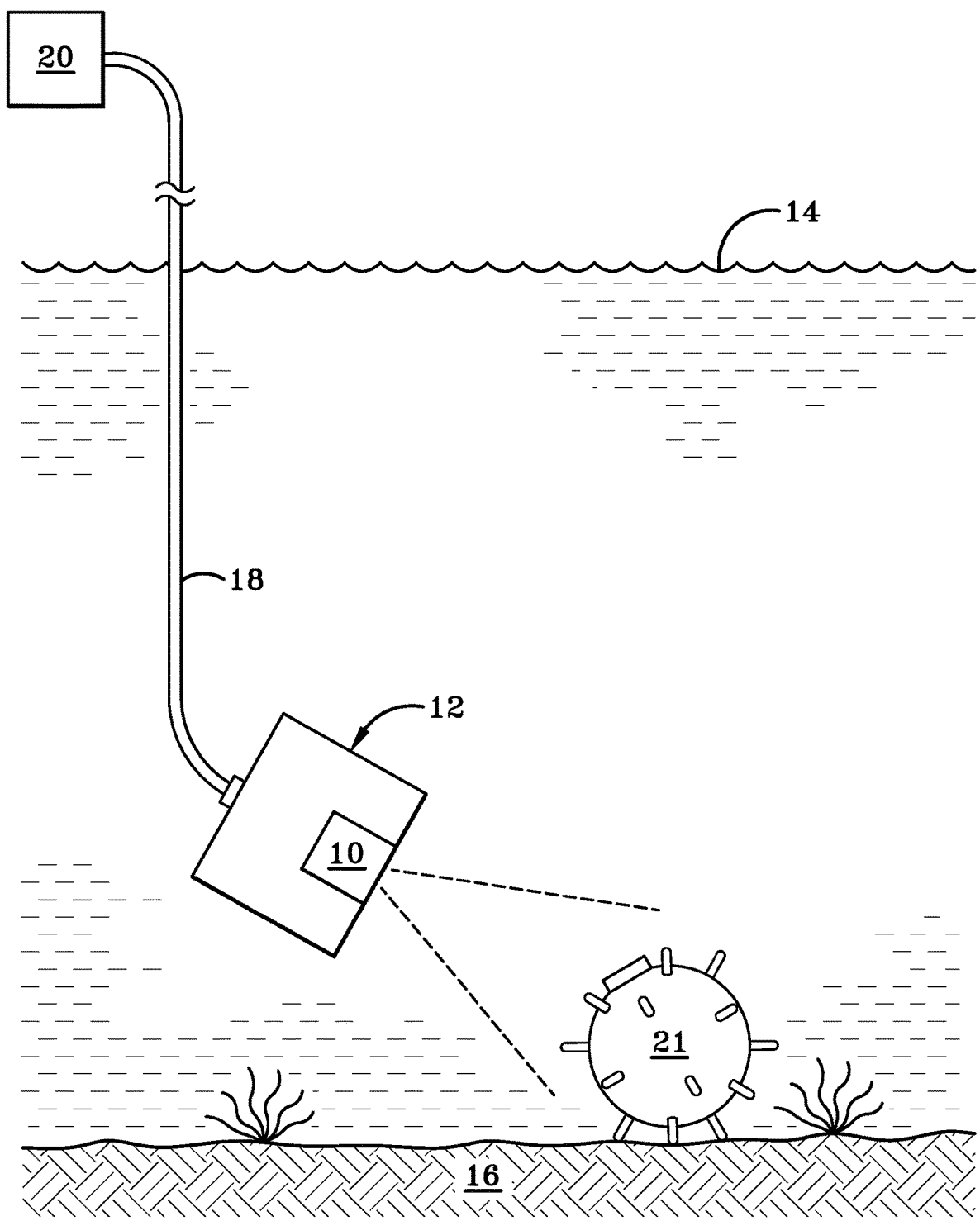
FIG. 1 is an environmental diagrammatic view of an exemplary system for generating three dimensional imagery according to one aspect of the present disclosure.

FIG. 1 schematically depicts an underwater environment within which the imaging system 10 of the present disclosure is configured to operate. The imaging system 10 may be carried by, supported by, or mounted to an underwater platform 12. In one particular embodiment, platform 12 is an unmanned underwater vehicle (UUV) that has an autonomous reacquisition manipulator system (ARMS). The ARMS on the platform 12 can include a variety of extending members or implements that are dexterous to manipulate items in the water column or below the water surface 14 or on the seabed 16. The platform 12 may include an electric tether 18 that extends out of the water above the water surface 14 to a control module 20 that may be positioned remote from the platform 12. In one particular embodiment, the tether 18 extends directly to the control unit 20; however, it is entirely possible that a wireless connection establishes communications between the control 20 and the various controls on platform 12 to operate the platform 12, the ARM system, and/or the imaging system 10 (i.e. tether-less).

Imaging system 10 on platform 12 is configured to detect an underwater target, object, threat, or UXO from a safe distance. Collectively, these objects, targets, UXO, and the like are referred to as object 21. The object 21 is 3D imaged by imaging system 10 in accordance with the methods described herein to achieve the various advantages within the parameters provided herein.

Figure 2:
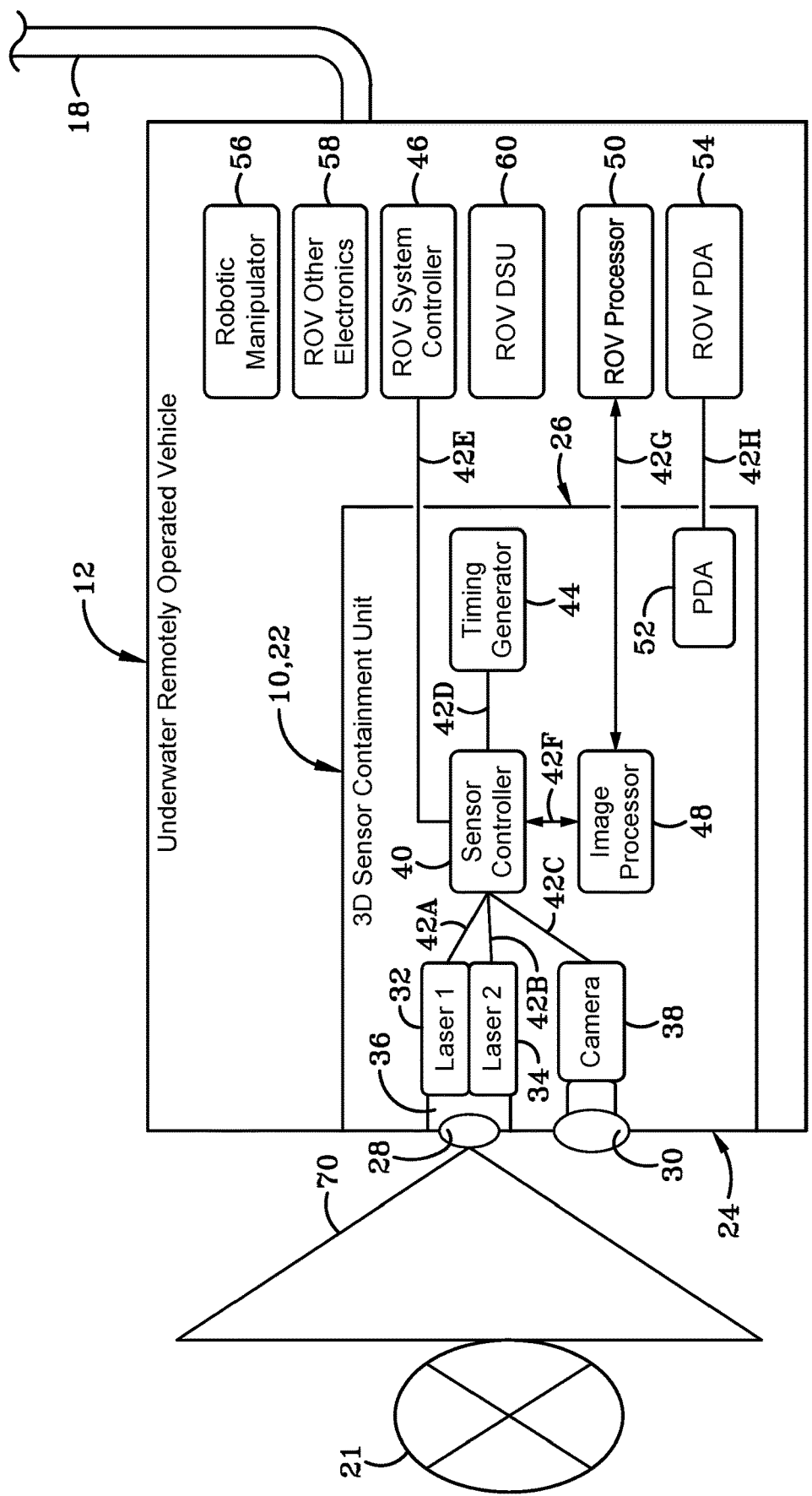
FIG. 2 is an operational schematic view of the exemplary system for generating three dimensional imagery.

FIG. 2 depicts a schematic view of the imaging system 10 on platform 12 that in one example is an underwater remotely operated vehicle. Imaging system 10 is housed within a sensor containment unit 22. Sensor containment unit 22 may be a relatively rigid structure defined by a plurality of walls configured to be mounted or supported by the platform 12. Containment unit 22 may include a first end 24 opposite a second end 26. The first end 24 is oriented in a manner such that it faces outwardly and away from the platform 12. In one particular embodiment, the first end 24 of containment unit 22 defines a first opening 28 and a second opening 30. The first opening 28 defines a laser beam exit port and the second opening 30 defines an imaging window or aperture through which the camera views the laser pulses exiting from the first opening 28.

Within the sensor containment unit 22, there is a laser beam generator or source that is configured to produce two sequential laser beams to be transmitted out of the first opening 28. In one particular embodiment, and as shown in FIG. 2, there is a first laser beam source or generator 32 and a second laser beam source or generator 34. As will be described in greater detail below, the first and second laser sources 32, 34 are configured to rapidly transmit sequential laser beams or pulses to be transmitted out of the first opening 28 in a short time-spaced sequential manner. Although two laser sources 32, 34 are depicted herein, it is entirely possible, if a single laser source can be recharged quickly enough, to fire two laser beams in rapid succession using only a single source. Thus, while two laser sources 32, 34 are depicted, a single source is entirely possible so long as two laser beams are transmitted out of the first opening 28. When two laser sources 32, 34 are utilized, it is envisioned that in one embodiment they will be vertically stacked in order to save space within the containment unit 22. Thus, while the first laser source 32 and the second laser source 34 are shown as arranged side by side in FIG. 2, other configurations are possible that would enable space-saving constraints. As will be shown in greater detail below, the first laser source 32 and the second laser source 34 are optically connected to a beam shaper and combiner 36 (FIG. 3) such that the laser beams generated from each respective source originate from the same location upon exiting the first opening 28.

The laser sources 32, 34 (or a single laser source as the case may be) in this example meets the ranging requirements of 0.01 m over a 0.5-m depth of field at 1.25 meter range, the signal-noise-ration (SNR) is greater than 30/pixel/image for each of 2 images. This results in greater than 900 photoelectrons. The Minimum Laser energy per image is 7 mJ (for each of 2 lasers). For a 10 Hz 3D update rate, there needs to be at least 0.07 Watts per pulse. The 0.07 Watts divided by the Repetition rate equals the required pulse energy. For 20 Hz update rate, the required pulse energy is 0.035 mJ/pulse. One exemplary laser that meets these requirements is the Quantel Viron that has dimensions of 195 mm×89 mm×59 mm and a 25 mJ/pulse at 20 Hz. Other lasers are possible as laser/imaging technology advances that could be used in lieu of a Quantel Viron laser that are able to exceed these specifications.

With continued reference to FIG. 2, adjacent the laser source or laser sources 32, 34, is a single camera 38. The camera 38 is aligned with the second opening 30 and is configured to detect images illuminated by the first laser beam pulse and the second laser beam pulse within the field of view of camera 38. Aspects of the camera will be described in greater detail herein.

The laser sources 32, 34 and the camera 38 are electrically coupled to a sensor controller 40 via transmission lines. Namely, a signal transmission line 42A electrically couples the first laser source 32 with the sensor controller 40. A second line 42B electrically couples the second laser source 34 to the sensor controller 40. A third line 42C electrically couples the camera 38 to the sensor controller 40. Transmission lines 42A-42C may be any mechanism or device capable of electrically transmitting signals between respective devices. Thus, the lines 42A-42C may be any wired or wireless connection capable of transmitting electrical signals between the respective elements.

Sensor controller 40 is electrically coupled with a timing generator 44 via transmission line 42D. Collectively, the sensor controller 40 and the timing generator 44 define a gating module that is adapted to adjust the exposure time on the camera and synchronize the sequential generation of the first laser beam from the first laser source 32 and the second laser beam from the second laser source 34. The sensor controller 40 is additionally connected with the remotely operated vehicle (ROV) platform system controller 46 via line 42E. Platform controller 46 is located externally from the containment unit 22 but is otherwise carried and disposed on the platform 12.

An image processor 48 is located within the containment unit 22 and electrically connected with the sensor controller 40 via line 42F. The image processor 48 is additionally coupled with the platform processor 50 via line 42G. The platform processor 50 is located externally from the containment unit 22 but is otherwise still carried by and disposed on the platform 12. The containment unit 22 may further house a power distribution assembly (PDA) 52 that is electrically connected via line 42H with the platform PDA 54 that is located externally from containment unit 22.

As is common on underwater platforms, platform 12 may include additional electronics such as the robotic manipulator 56, which is electrically connected with the ARMS, other electronics 58 and the platform data storage unit (DSU) 60. Collectively, the processed images from the image processor 48 being sent to the ROV processor 50 may be transmitted along with other signals from the underwater platform through the tether cable 18 up to above the water surface 14 to the central control 20.

Figure 3:
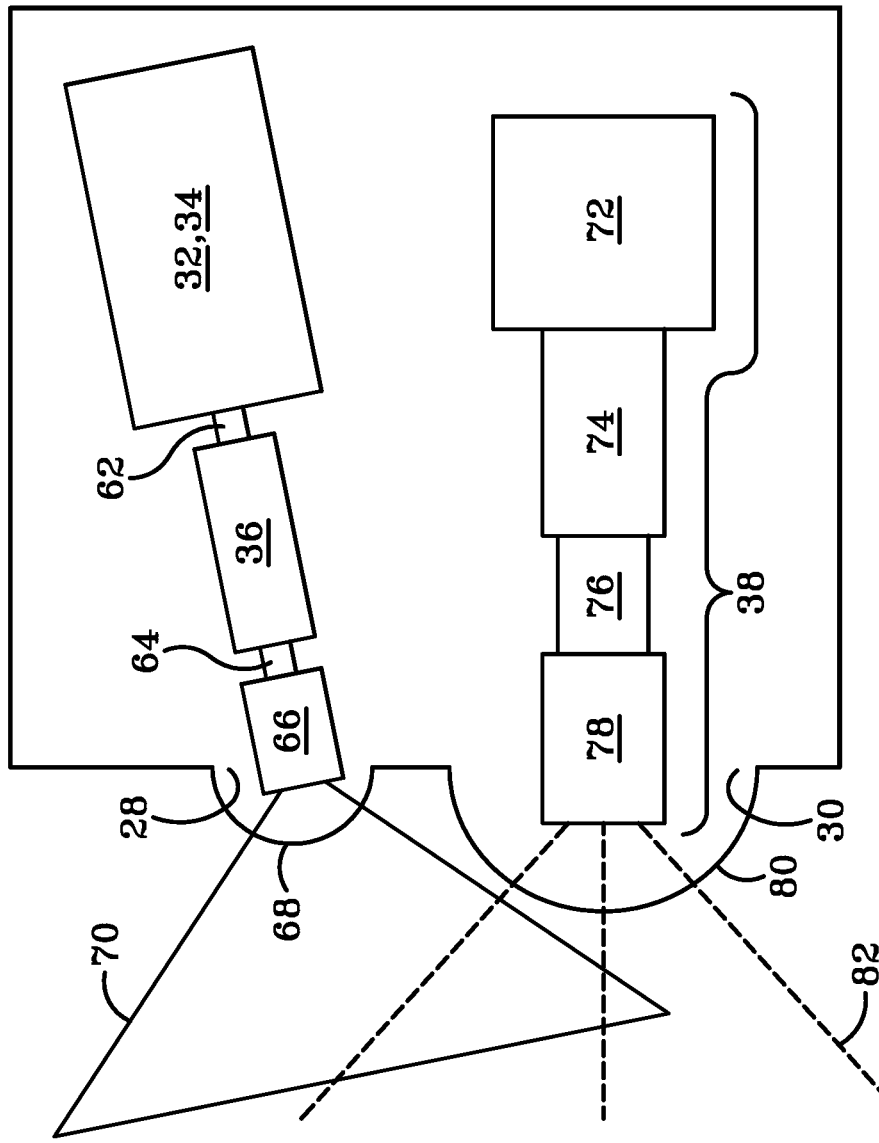
FIG. 3 is an operational schematic view of an image sensor and its assembly, and at least one laser source utilized in the exemplary system for generating three dimensional imagery.

FIG. 3 schematically depicts a portion of the imaging system 10 to further identify the elements of the laser and camera systems. Within the imaging system 10, the first laser 32 and the second laser 34 are stacked vertically on top of each other within containment unit 22 and therefore shown as a single box in FIG. 3. The first laser source 32 and the second laser source 34 are each optically coupled with a beam shaper or beam combiner 36. A laser relay 62 electrically couples each of the laser sources 32, 34 to the beam shaper and combiner 36. The beam shaper and combiner 36 ensures that the laser beams generated from the respective sources 32, 34 are output from first opening 28 from the same location sequentially one after another. The beam shaper and combiner 36 may be coupled via laser relay 64 to a laser beam diverger 66. The diverger 66 directs the first and second laser beams out through the opening 28 through a hemispherical dome 68 to generate a laser broadcast pattern 70. The broadcast pattern 70 is defined by the beam projector or diverger 66 and in one example is for a pattern 70 of 50 degrees×80 degrees field of view for the first and second laser beams.

Containment unit 22 is relatively small in size. In one particular embodiment, containment unit 22 is about 8 to 9 inches long, about 10 to 11 inches wide, and about 4 to 5 inches high. In this embodiment, with a relatively small containment unit 22, some of the other components such as sensor controller 40, timing generator 44, and image processor 48 may not be contained within the containment unit 22 and may instead be placed at another location on the platform 12 and be electrically connected via transmission lines to the containment unit 22 that contains the laser sources 32, 34 and the camera 38.

With continued reference to FIG. 3, within camera 38 or coupled with camera 38 is a focal plane array 72, relay optics 74, an image intensifier 76, and an objective lens 78. The objective lens 78 is positioned within or closely adjacent a hemispherical dome 80 covering the second opening 30 and allows and captures a field of view 82. The objective lens focuses light captured within the field of view 82 onto the intensifier 76. The intensifier 76 intensifies the captured wavelengths and transmits the signal via relay optics to the focal plane array 72.

The sensor or camera 38 should meet or exceed the following specifications. One exemplary camera 38 or sensor that is able to meet or exceed these specifications is a PIV camera, however other cameras or sensors are possible as imaging technology advances that could be used in lieu of a PIV camera that and be able to exceed these specifications. The camera, regardless of whether it is a PIV camera 38 or another future camera, should be greater than 12 bits, have a large focal plane (14 mm×16 mm or greater), and be greater than 10 Hz double-frame rate (i.e., 2 frames capture within 1 ms separation).

The image intensifier 76 should meet or exceed the following specifications. One exemplary image intensifier 76 or image logic that is able to meet or exceed these specifications is commercially available for sale by Hamamatsu, Model No. C9647-01 having a 25 mm InGaAsP photocathode, however image intensifiers or image logic are possible as imaging technology advances that could be used in lieu of a Hamamatsu, Model No. C9647-01 having a 25 mm InGaAsP photocathode that will be able to exceed these specifications. The image intensifier or image logic, regardless of whether it is a Hamamatsu, Model No. C9647-01 having a 25 mm InGaAsP photocathode or another future image intensifier, should be able to be coupled with the focal plane array of the camera or sensor, typically in a 1:1 coupling (described in greater detail herein with respect to FIG. 6), however other couplings are possible.

In one particular embodiment, the image intensifier is where the gating occurs. The image intensifier 76 is where the exposure is turned on and turned off. The camera 38 has independent exposure that may be turned on and off but typically not at the rate at which is needed for this system. This system 10 needs exposure times on the nanosecond level. Typically, the independent camera can only turn on and turn off exposure on the microsecond level.

The focal plane array (FPA) 72 should meet or exceed the following specifications. One exemplary FPA that is able to meet or exceed these specifications is commercially available for sale by Oxford Instruments Andor, Model No Zyla 5.5 sCMOS, USB3.0, however image intensifiers or image logic are possible as imaging technology advances that could be used in lieu of an Oxford Instruments Andor, Model No Zyla 5.5 sCMOS, USB3.0 that will be able to exceed these specifications. The FPA should be at least a 5 megapixel, 6.5 um pixel-22 mm diagonal, with 0.9 e-read noise, 60% QE, and 100 fps Camera link: 40 fps from USB 3.0.

The field of view 82 in one example should meet or exceed the specification of being at least 80 degrees×54 degrees (87° diagonal). The lens in one example should meet or exceed the following specifications of an f-number of f/2.3. In one instantiation, the focal length of the lens is 12 mm and the clear diameter is 5.2 mm. Other lens are possible as lens technology advances that could be used in lieu of the lens described herein, however it is envisioned that these specifications should at least be a minimal threshold.

The pixel size in one example should be at least 6.5 microns, 2560×2160. The Bin image is 2×2 to achieve a 13-micron effective pixel size, 1080×1280 pixels. The region of interest (ROI) may be scaled down to 720×1280 pixels in one example.

Figure 4:
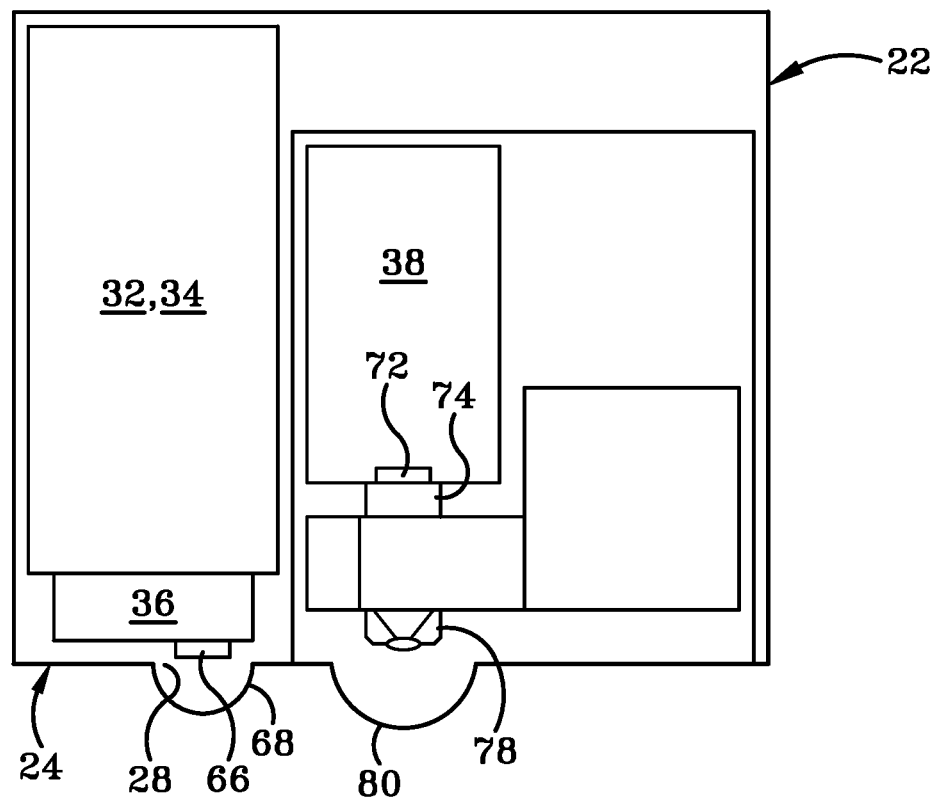
FIG. 4 is a schematic top plan view of the image sensor and its assembly, and at least one laser source utilized in the exemplary system for generating three dimensional imagery.

FIG. 4 depicts a top view of an exemplary layout of the first and second laser sources 32, 34 relative to the camera 38. As shown in FIG. 4, the laser sources 32, 34 are stacked on top of each other and the beam combiner 36 is positioned closely adjacent the first end 24 of containment unit 22. The diverger 66 is closely adjacent first opening 28 that is covered by hemispherical dome 68 that collectively define a beam projector. When viewed from above, the camera 38 is offset to the right of the lasers 32, 34.

Figure 5:
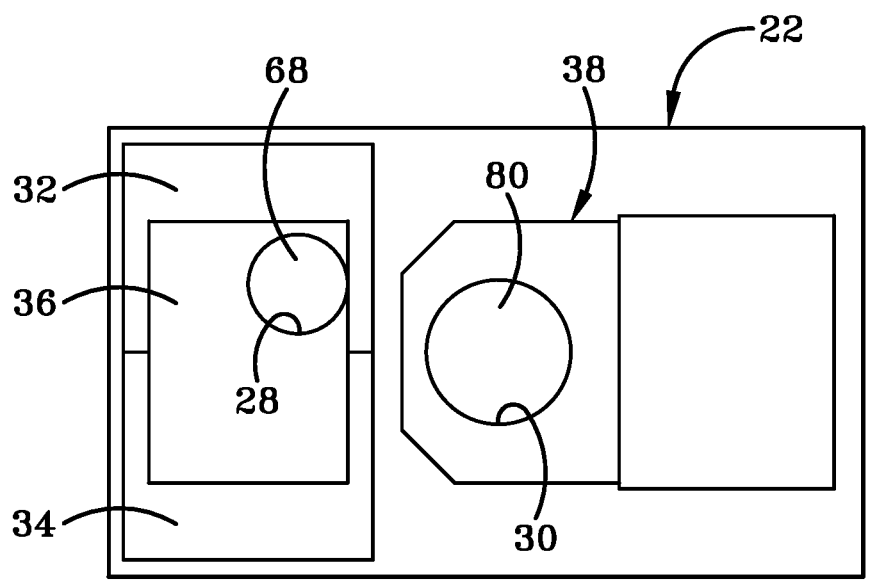
FIG. 5 is a schematic end elevation view of the image sensor and its assembly, and at least one laser source utilized in the exemplary system for generating three dimensional imagery.

FIG. 5 depicts a first end elevation view of the containment unit 22. When viewed from the first end, it is seen that the first aperture 28 covered by dome 68 is offset slightly vertically above the opening 30 covered by dome 80. Although the first opening 28 is offset slightly above second opening 30, other locations are entirely possible. Ideally, the distance between transmitter and receiver outputs would be made as small as practical while minimizing the total volume the system. The offset in this example is an artifact of the polarization-based beam combiner optics. The beam combiner requires the combined output to be in front of either first laser 32 or second laser 34. With the two lasers stacked, and then packaged with the receiver assembly as compactly as possible, an offset between transmitter and receiver output windows was inevitable. In a different example, with a single double-pulsed laser doing the work of the two single-pulsed lasers, the windows would not need to be offset.

Figure 6:
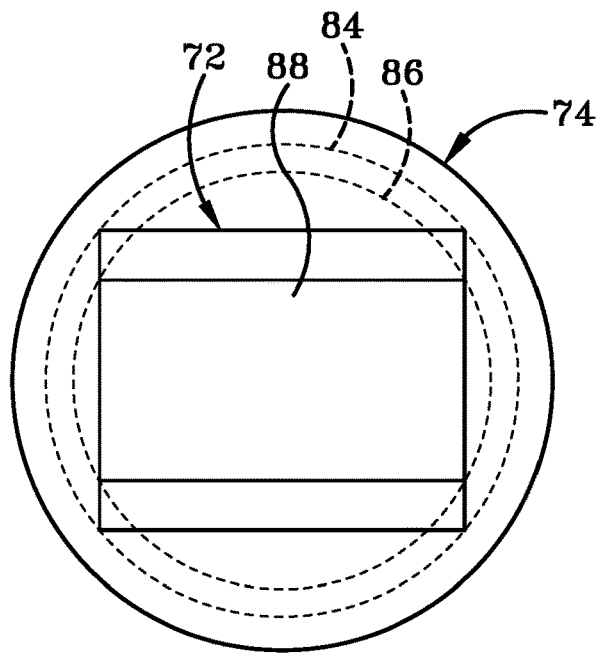
FIG. 6 is a schematic view of an exemplary optical coupling and focal plane array utilized in the exemplary system for generating three dimensional imagery.

FIG. 6 schematically depicts the orientation and size alignment of the relay optics 74 relative to the focal plane array 72. Focal plane array 72 in one example has an area that is approximately 16 millimeters by 14 millimeters with a 21.8 millimeter diagonal. The relay optics 74 are generally circular in cross section and in one example having a 25 millimeter diameter. The first circular dash line 84 in this example represents a 21.8 millimeter diameter circle within which intensified images or signals from the image intensifier 76 move through the relay optics onto the focal plane array 72. The second dashed circular line 86 in this example represents a 19.8 millimeter diameter that the relay optics may be shrunken or narrowed to better focus the intensified image signals onto the focal plane array 72. This process is known as binning. If the binning process occurs, the focal plane area may be reduced to a smaller subset for image processing on the focal plane array 72 as identified by box 88, which in this example has a width of 16.6 millimeters by a height of 9.4 millimeters to result in a 19.8 millimeter diagonal such that all the intensified images are captured by the focal plane array 72 within box 88.

The larger circular dash line 84 represents the image intensifier's optical area. The larger circle circumscribes the image intensifier's focal plane array as a whole. In this example this is 21.8 millimeters diagonal. In order to use the full focal plane, no tapering is necessary because there is complexity without gaining much sensitivity. A coupling or coupler takes the area down to whatever is needed on the focal plane array.

With continued reference to FIG. 6, a one-to-one coupling or coupler may be any coupler that couples the two optical objects together. In one particular embodiment, the optical coupling may be a lens and another embodiment the optical coupling may be a fiber-optic cable. A lens relay will be more optically efficient but would occupy more space. Inasmuch as this coupler device needs to be relatively small, a fiber-optic cable may be more beneficial is some situations where space constraints are a priority. Thus, an optical lens may be used when there is enough volume and when there is not, a fiber-optic relay will be used.

The term one-to-one coupling refers to a one-to-one ratio of transferring data or optical images. The image intensifier takes the light and converts it to electrons. The electrons are multiplied and then converted back to light again. The light exiting the image intensifier needs to be taken to the focal plane. As said previously, it can be taken by a coupler. In some instances, the focal plane may not be the same size as the exit port of the image intensifier. Thus one-to-one refers when the image output is not modified or shrunken or expanded relative to the image that is provided to the focal plane array. However, other embodiments would be entirely possible with a tapered fiber bundle that would narrow or reduce the optical image output from the image intensifier to the focal plane array. For example, a scenario is possible where the output of the image intensifier is approximately 25 millimeters and the focal plane array is 5 millimeters. In this scenario, the output of the image intensifier will need to be reduced to focus the light onto the focal plane array.

Figure 7:
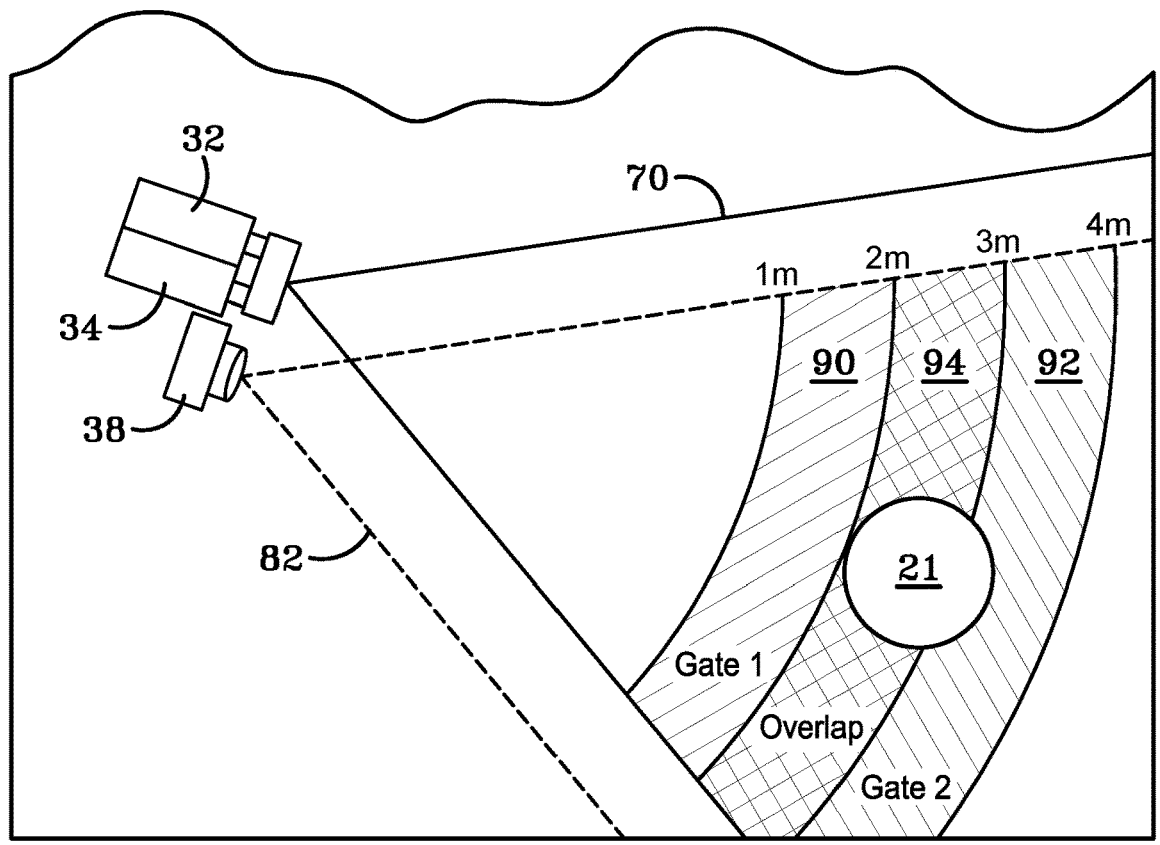
FIG. 7 is an operational diagrammatic view of the present disclosure the detection of an object within an overlap region defined by a first gate and a second gate.

FIG. 7 schematically depicts the operation of system 10. The schematics of FIG. 7 only show the first laser source 32, the second laser source 34, and the camera 38; however, it is to be understood that the other features described herein work in conjunction with these elements. FIG. 7 represents that two pulsed sources of laser beams exit the beam combiner within the laser broadcast pattern 70 sequentially one after another in very close in time. The gating module defined by the sensor controller 40 and the timing generator 44 work in conjunction with the camera 38 to establish a first gate 90 and a second gate 92 to thereby define an overlap region 94. Typically, the first gate 90 is equivalent to a distance from about 1 meter to about 3 meters from the camera 38. The second gate 92 is generally equal to a distance from about 2 meters to about 4 meters from the camera 38. Thus, the overlap region 94 is a distance from about 2 meters to about 3 meters away from the camera 38. When the object 21 is within the overlap region, it is captured by both images. Namely, a first image is captured of the first laser beam within the first gate 90 and a second sequential image is captured with the second laser beam at the second gate 92. As will be described in greater detail below, when an object appears in the overlap region 94, it will reveal itself in both images. These images are then processed using 3D formation techniques to reveal the three-dimensional shape of object 21 within the overlap region 94.

To accomplish 3D imaging in the ocean, generally the following imaging parameters are used according to one example. The range resolution (FHWM) in one example should be less than 0.1 m for a target at a range of 3 m and the FHWM should be less than 0.01 m for a target at a range of 1.25 m. The depth of field threshold in one example is in a range from 0.75 m to 1.25 m with an objective being 0.5 m to 1.25 m. In one embodiment, it may be useful to have an adjustable depth of field from 0.5 m to 3 m from the sensor (i.e., camera 38). The 2D sample distance (GSD) threshold in one example should be less than 2.9 mm in depth of field (for 720p resolution) and the objective being less than 1.9 mm in depth of field (for 1080p resolution). The Horizontal sample distance threshold should have a goal of being 30% contrast within GSD. The instantaneous field of view in one example should be greater than 3 m×5 m at a range of 3 m to the target and should be 1 m×1.67 m at a range of 1 m to the target. The angular instantaneous field of view in one example should be greater than 80° wide×50° height (1.4 radians×0.9 radians). The update rate threshold in one example should be greater than 10 Hz with the objective update rate being 24 Hz. The target reflectance (Lambertian) threshold should be 30% with the objective being 10%. The Latency threshold in one example should be 0.1 second from time of light received to time video frame sent to the system processor.

The following presents exemplary processing requirements for the 3D-shape formulation. The present disclosure alternates gate delays between odd and even shots. The shot separations are only a few microseconds but may be up to one millisecond. Then, the system sets the difference in gate delay times to be optimum for required DoF (~0.5 m). The delay time difference is on the order of nanoseconds. The gate width is on the order of 2× delay-time difference.

The system 10 or operator of the system advances the first and second gates so that the object 21 of interest is bright in both gates, preferably in the overlap region 94. Then, the system selects flattening files for the range of interest. Also, the system selects a 3D look-up table for the range of interest. The look-up table size in one example is about 921,600×(3 m−0.5 m)/0.01 m*2 bytes, which is about 461 Megabytes.

For each PIV-mode shot there is captured 2 images. In this example the Bin each on chip is 2×2, and then ROI to 720×1280 is 921,600 pixels. The system subtract dark pixels and divides by flat pixels. This results in about 3.7 Million floating operations (3.7 GFLOPS). Then, the system divides Even Images by Odd images, with error correction. This results in about 4.6 Million floating operations (4.6 GFLOPS). The system then applies ratio-to-range look-up table at 64 operations per pixel for about 59 Million floating operations (59 GFLOPS). This high number of floating operations are maximums based on upper bound requirements. However, the system may implement framing to reduce the number of GFLOPS. Framing at 10 Hz results in about 1.35 GFLOPS and framing at 20 Hz results in 2.7 GFLOPS.

Regarding timing of the laser pulse, one exemplary embodiment utilizes a Gaussian pulse with FWHM of about 12 ns which is about 2.7 meters. The gates should be shorter than laser pulse FWHM, namely, from about 6 ns to about 12 ns. The two gates will be separated by an amount equal their ½ width, which is a total of about 1 gate width. The range to target of about 1.25 m equals about 11.1 ns round-trip laser travel time. For the closest point of about 0.75 m, this results in about 6.7 ns round-trip laser travel time.

In one example, the first gate 90 (i.e., Gate 1) is 6 ns wide, starts in time to hit full sensitivity in about 3 ns after light-out from laser. The second gate 92 (i.e., Gate 2) is 6 ns wide and starts 6 ns later. The gated return pulse looks Gaussian, with FWHM or about 16 ns.

Having explained the configuration and parameters of system 10, reference is now made to its operation and various features. The present disclosure relates to a robotic vision system that can perform three-dimensional (3D) imaging precisely enough that a robotic manipulator could perform a function based on the 3D image. One exemplary task that the 3D image could be used to accomplish would be to defuse an underwater mine. The robotic manipulator is typically carried by an underwater vehicle that may be manned or unmanned. One exemplary manipulator is an autonomous reacquisition manipulator system (ARMS). The ARM system is an underwater robotic system having a compact, highly maneuverable, stable unmanned underwater vehicle (UUV) with a dual-manipulator system that enable reacquisition and mitigation of underwater explosive hazards by providing personnel the capability to remotely access, diagnose, render safe, neutralize or move/remove underwater mines, improvised explosive devices (IEDs) or objects 21 from a safe distance. To perform the manipulations, the ARMS device needs an imaging system so that an operator operating the manipulators can view the underwater mine or IED or object 21.

To perform the 3D imaging underwater, which can be a scattered and/or turbid medium, there are choices that can be made to accomplish the 3D imaging. One exemplary possibility is a 2-camera system that takes images in parallax. However, parallax image processing comes with some problems associated with correspondence problems that are very complicated in a scattering medium, such as ocean water where everything is blurred. Thus, there continues to be a need for an underwater 3D imaging system that does not rely on a two-camera system in order to obviate or eliminate or reduce the parallax problem associated therewith.

Another exemplary attempt for underwater 3D imaging may be a LiDAR-based system. However, conventional LiDAR systems do not operate at the processing speeds required to achieve the need of providing a rapid rate 3D imaging feed achieved by the solution of the present disclosure. Namely, the present disclosure seeks to provide a solution for providing 3D images at video rate in a turbid and scattering underwater environment that may be dark due to extreme depths nearing a thousand feet deep. Video rate able to be achieved by the present disclosure is at least about 20 Hz, and preferably about 30 Hz. For 1080p, the video data standard frame rate is about 8 Mbps and the video data high frame rate is about 12 Mbps. For 720p, the video data standard frame rate is about 5 Mbps and the video data high frame rate is about 7.5 Mbps. For 480p, the video data standard frame rate is about 2.5 Mbps and the video data high frame rate is about 4 Mbps. For 360p, the video data standard frame rate is about 1 Mbps and the video data high frame rate is about 1.5 Mbps.

System 10 provides an imaging system for underwater vehicles or platform 12 that uses a single camera 38 to achieve a 3D image, thereby reducing or eliminating the parallax problem normally associated with 3D image processing. The system of the present disclosure uses a laser or a plurality of lasers modified with a particle imaging velocimetry (PIV camera) that allows the system to operate with at least one laser and only one camera. This allows the system to be a significantly more compact system. The PIV camera is configured to track particle flows in a turbid environment. The PIV camera is adapted to now perform 3D imaging in a manner that is now more precise than traditional stereoscopic cameras and in a fewer number of pictures and data than was previously possible with the same stereoscopic cameras or a LiDAR system at the desired video rate. The PIV camera is able to perform the 3D imaging more precisely than standard stereoscopic camera systems with many fewer pictures or less data than would if the 3D imaging process were attempted with a brute force tined LiDAR system.

The imaging system of the present disclosure requires that two laser beam pulses be generated and transmitted sequentially shortly one after the other (on the microsecond level). However, the generation of the two laser beams may be accomplished in a number of different ways. For example, there may be two separate laser generators having common output optics to transmit the beams. Alternatively, there could be a single laser generator that generates two different laser beams in rapid succession. Each scenario is possible provided that the overlap of the first gate 90 associated with the first laser beam and the second gate 92 associated with the second laser beam is achieved. The timing of the pulses occurs sequentially within microseconds of each other. For example, the first pulse may be fired at a first time and the second pulse fired sequentially thereafter at a second time that is in a range from 1 microsecond to about 5 or 10 microseconds after the first time. Sequential firing of the two pulses enables the PIV camera to gather the two different images at the two different times so the movement of the particles may be evaluated between the first captured image at the first time at the PIV camera 38 and the second captured image at the second time at the PIV camera 38. The PIV camera 38 is gated to the lasers so that it frames when the first laser fires and frames again when the second laser fires. Essentially, it is one camera 38 taking two quick succession snapshots within a few microseconds of each other. These two images are stored or sent directly to a processor that may be in any location but is preferably on the underwater vehicle. However, it is entirely possible for the PIV-captured images to be sent to an above-surface processor because data rate is low enough compared to other 3D imaging systems to send the images over a tether or cable from the underwater device to an above-surface processing unit. Regardless of the processor's location, processing the captured PIV images to create a 3D image is relatively simply and the data rate is low. Data rate for this configuration and method is about the same as a conventional video data rate.

In operation and as shown in FIG. 7, the two lasers need to be pulsed or fired in order to illuminate a field of view 82. PIV camera 38 is gate timed with the two pulses. The gate timing refers to the PIV camera only accepting light from a certain range of distances; for example, one meter to three meters away from the PIV camera 38. This is accomplished through a gating module that is coupled with the sensor or camera 38 controller and timing generator or may be a part thereof. The gating module takes the Q-switch signal from the laser or some other equivalent signal from the laser that is indicative of when the laser fired and the gating module sets a timer that tells the camera to start the exposure at some time thereafter and to stop the exposure at another time thereafter that would equate to the range from the PIV camera 38 to the object 21. So the gating module enables the PIV camera 38 to capture the first gate 90 corresponding to a distance from one meter to three meters from the PIV camera that is associated with the first laser pulse. For the second laser pulse, the gating module may start the exposure and end the exposure of the camera associated with the second laser pulse in the second gate 92 located at a distance from two meters to four meters from the PIV camera. This creates and overlap region 94 from two meters to three meters away from the PIV camera. When the object 21 is within the overlap region 94, it may be detected in both images and the slight movement of the object between the two images can be processed for 3D imaging. The overlap area achieves very precise ranging. The overlap does not need to be one meter in distance, it could be larger or smaller. This would be a design choice of the application-specific needs of the operator. When the overlap is smaller, there is a higher sensitivity and when the overlap is larger, there is a lower sensitivity. The smaller the overlap region 94, the most sensitivity the system needs to have in the receiver to overcome noise sources, such as dark noise or photon noise. Thus, the overlap region can be optimized based on the application-specific needs of the user; however, one envisioned overlap region may be about a meter in length.

In operation and with continued reference to FIG. 7, the target 21 is revealed or shown in the image of both the image associated with first gate 90 and the image associated with the second gate 92. When the object 21 is shown in each of the gated images, there is a precise overlap region 94 to allow ranging and 3D imaging processing to be accomplished for the portions of the object that reveal themselves in each gated image. If the object is only revealed in one of the gate images, then the system 10 may adjust the distance and corresponding time for the gated image to achieve the capture of the object so that the 3D image may be processed at a video rate. The PIV camera 38 captures the first image, such as the gated first image, and then sequentially captures the second image, the gated second image. Those images are then transferred to a processor to accomplish the 3D calculations. The process of creating the 3D image from the two gated images may be accomplished by 3D imaging techniques.

In accordance with one aspect of the present disclosure, one exemplary system that incorporates the PIV camera 38 is distinguishable from previous uses of PIV cameras inasmuch as previous attempts used PIV cameras were on static systems often used in a controlled environment. One distinction about the example of the present disclosure is that the PIV camera is used on an underwater vehicle in a moving or dynamic environment. With the vehicle drifting under water due to currents, and even sometimes in an uncontrollable manner, the PIV camera 38 enables precise 3D imaging methods, processes, logic, or algorithms to generate a 3D video stream at a sufficiently low data rate based on the high-speed capture of images from the PIV camera 38 in order to guide the underwater vehicle. Because the vehicle or platform 12 is drifting and moving, the data for the 3D imaging must be obtained within microseconds in order to do the 3D processing at a video rate. If the system 10 waited too long or there was too much of a time period between the successive snapshots, then the errors due to the range changing based on platform movement/drift would become too large. Further, because the platform is drifting, a transmission rate in the video range is needed so that the two pictures and the motion of the platform, the roll, tilt, and yaw, and pitch, and translation of the objects relative to each other are largely not affected because the timeframes between the images is so short so as to not affect the imagery.

Regarding the operation of the gating module is part of the sensor controller that is operatively connected to the timing generator. Together, the sensor controller engaging module operate to image the target. The object 21 is located within the wide field of view, which must be wide. The term "wide" with referring to the field of view refers to a field of view greater than 45 degrees. In one particular embodiment, the field of view is in a range from about 50 degrees to about 90 degrees. In one specific example, the field of view is about 80 degrees. Typically, a wide field of view is difficult for precise 3D imaging for a significant depth of field. A significant depth of field in this instance refers to a depth of field that is in a range from about half a meter to about two meters. Accomplishing a wide field of view is typically very problematic and difficult for a stereoscopic system having two cameras. The present disclosure sought to solve this need by utilizing a single camera so that it can achieve the wide field of view needed for the present disclosure. However, the selected camera needs to be a very fast or very rapid camera that can obtain two-gated image in rapid succession. Thus, one exemplary camera of the present disclosure is the PIV camera. Wide field of view is achieved by a unique underwater lens system for both the laser and the camera. The wide field of view is accomplished through a hemispherical dome having a radius of curvature that centers the effective focal plane on the effective origin of the laser to not distort the laser or the camera.

In operation, when the lasers 32, 34 are initiated, the clock from the timing generator begins. This must account for any timing delays in the laser. That clock then instructs the camera to start its exposure and it also sets when the intensifier turns on and when it turns off. Thus, the order of operations will be that the camera turns on, then the intensifier turns on, then the intensifier turns off, then the camera turns off. The laser clock is the master clock that controls the time from when those functions occur.

In operation, the sensor controller and timing generator, and included gating module, are in electrical communication with the laser sources 32, 34 and the camera 38. In addition to the gating function, the sensor controller and the timing generator are adjusting the camera exposure time. Additionally, the sensor controller and timing generator will be adjusting the gain of the camera. For example, the gain may need to be increased if there is a very turbid medium or very turbid underwater environment. Additionally, the sensor controller may adjust various power levels on the laser, to the extent that they are adjustable, depending on the turbidity of the medium. The power can be turned down if there is more light than expected or increased if the environment is darker than expected. The timing generator and sensor controller will also timestamp the lasers and the camera so that they are consistent with each other.

The sensor controller and timing generator determines the time separation between the first image and the second image. The sensor controller and timing generator further determines when, or the time at which the images were taken, in conjunction with when the laser pulses were fired from the beam former. There also may be safety interlocks that are implemented in the sensor controller that could prevent the lasers from firing so as to not inadvertently fire the laser pulses at an undesired time. The image sensor processor is in electrical communication with the sensor controller. The processor is located on the sensor containment unit 22 and is electrically coupled to the processor on the remotely-operated vehicle or underwater platform. This image processor processes the obtained image from the camera to perform the 3D imagery creation on the underwater remotely-operated vehicle so that the effective 3D image stream at a video rate can be transferred to the ROV processor and transmitted through the tethered cable up to the operator located above the surface of the water.

The camera 38 obtains the first gated image and the second gated image in response to the instructions received by the sensor controller as to when to capture the photographs. The images are sent to the image processor at a relatively fast rate. In one example, the pair of images are sent twenty times per second. Each pair of images is processed to generate two additional images. Namely, a processed grayscale image to give the operator an image that is utilized to create a 3D range image. The 3D range image enables the operator to determine how far away the target is from the underwater vehicle. The image processor may also filter or clean any poor images or bad pixels. Then, the image processor performs calibrations or calibrates for an adjustment of the gain of the camera. Then, the 3D image processing may be completed.

The image processor then transfers the black and white photograph as well as the 3D ranged photograph to the operator on the surface. In one particular embodiment, the image processor is electrically coupled with the ROV processor so that the two images are transferred through the ROV processor. However, it is entirely possible for the image processor to send the black and white image and the 3D range image directly to the operator thereby bypassing the ROV processor.

Alternatively, the processing or image processor for processing the two images into the 3D range photograph or video stream may occur entirely on platform 12 and not need to be processed through the ROV processor. This enables the 3D images to be streamed at a video rate back to the controller or control module 20 located above the water's surface. An additional embodiment of system 10 may include an automated process or algorithm on the under water platform 12 that receives the processed 3D images from the imager as an input into a manipulator logic. The manipulator logic is part of the ARMS system that utilizes the 3D video stream or plurality of images from the image processor to determine how to manipulate the extending members or implements that are dexterous to manipulate items in an automatic manner in repose to the 3D video imagery obtained by system 10. Particularly, the automated algorithm or process may also be embodied and executed through a processor on the platform 12 to manipulate or advance the dexterous arms or members towards the target or object 21 to manipulate said object in a desired manner.

The system 10 may also provide feedback to the ROV system controller. This is an advantage inasmuch as even if the camera is out of range for 3D imaging, if the object is in range of either of the two photographs, the sensor controller will be able to indicate to the ROV system controller that the ROV is approximately some distance relatively close to the object. Taking the previous distance example provided, it could indicate that the ROV is more than one meter away from the object but less than two meters away because the object would be detected in one of the images but not in the overlap region. This will allow the platform 12 or ROV operator to adjust how fast the platform 12 or ROV advances towards the target or object 21 until the object 21 appears in the overlap region 94 of both images so that the 3D imaging may begin to occur where the images are overlapped. Similarly, if the images indicate that the ROV is too close to the object 21, which may be indicated by a high shadowing in the images, it could send instructions to the ROV system controller to back up or reverse direction so to space the ROV more appropriately from the object in order for 3D imaging to occur at the video rate when the object is in the overlap region.

Figure 8A:
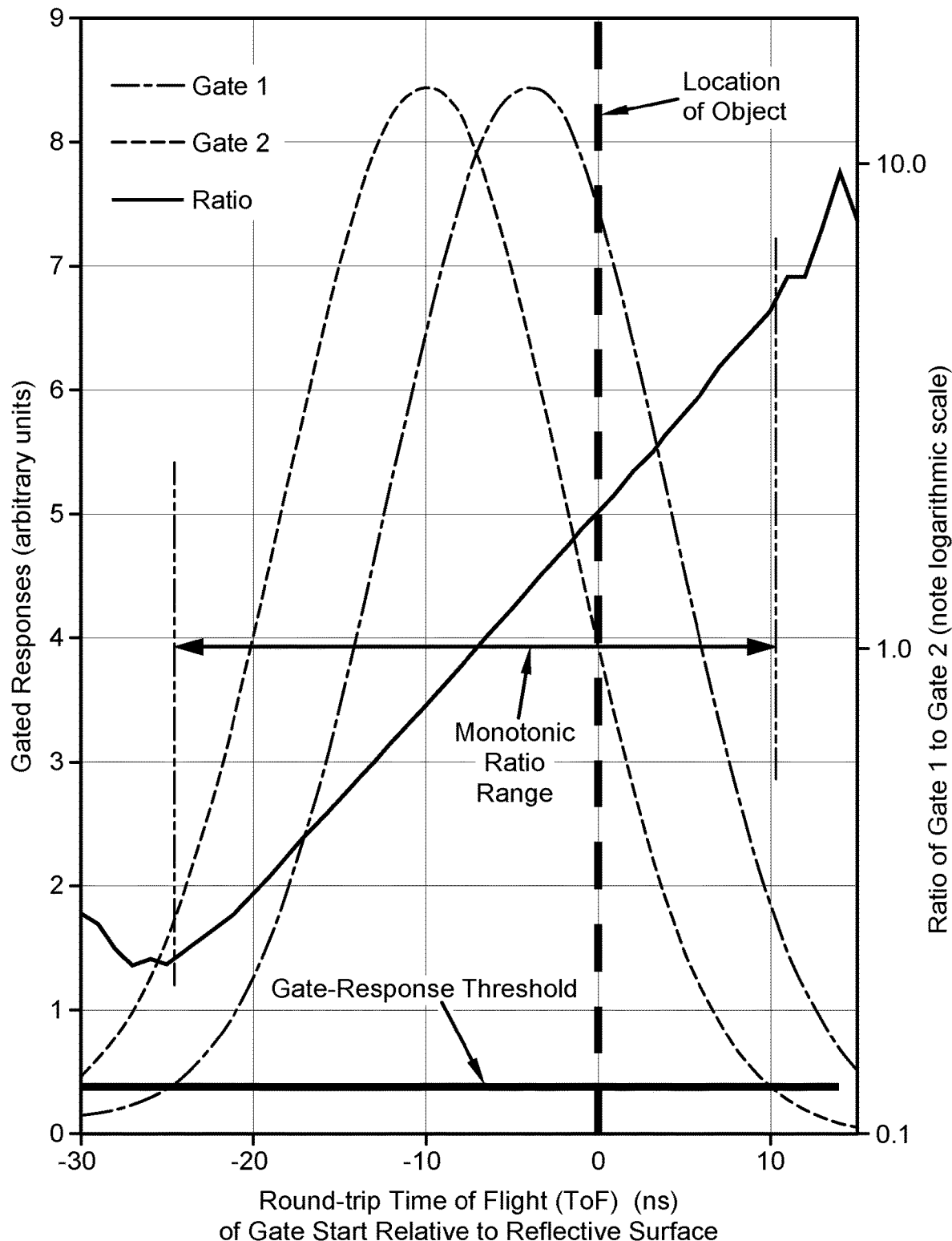
FIG. 8A is a graph representing the gated response of a first laser beam pulse and a second laser beam pulse utilized in the present disclosure, together with the ratio of gated responses of the first to the second laser pulse.

As depicted in the graph of FIG. 8A, the response of the optical system reflecting a laser pulse from a reflective surface is typically a bell-shaped curve, rising to a peak as the gate-start approaches the reflective object, then falling to zero as the gate-start moves past the object. The response may in some cases have a flattened top, depending on the gate width and the laser pulse shape and duration. The net system response is a function of the transmitted laser pulse temporal shape, the receiver gate duration, and the receiver gate turn-on and turn-off time constants. The laser pulse is typically emitted in a Gaussian manner, though other shapes, such as Lorentzian, log-normal, or others are also used. In the example shown in FIG. 8A, the laser pulse duration is a 12 ns Gaussian, and the gate is a 12-ns-wide rectangular function, so that the net response is the bell-shaped curve depicted. In other embodiments, the gate response may not be a perfect rectangular function, but may have a ramp-up and ramp-down time, which will also contribute to the rounded edges of the net gated response. The X-axis of the graph of FIG. 8A represents a nominal round-trip time of flight (ToF) in nanoseconds of the start of a gate, relative to the ToF to the reflective surface for a delta-function impulse response, and the first Y-axis represents the intensity of the gated responses, and the second Y-axis represents the ratio of the first gate response to the second gate response over time in nanoseconds.

Figure 8B:
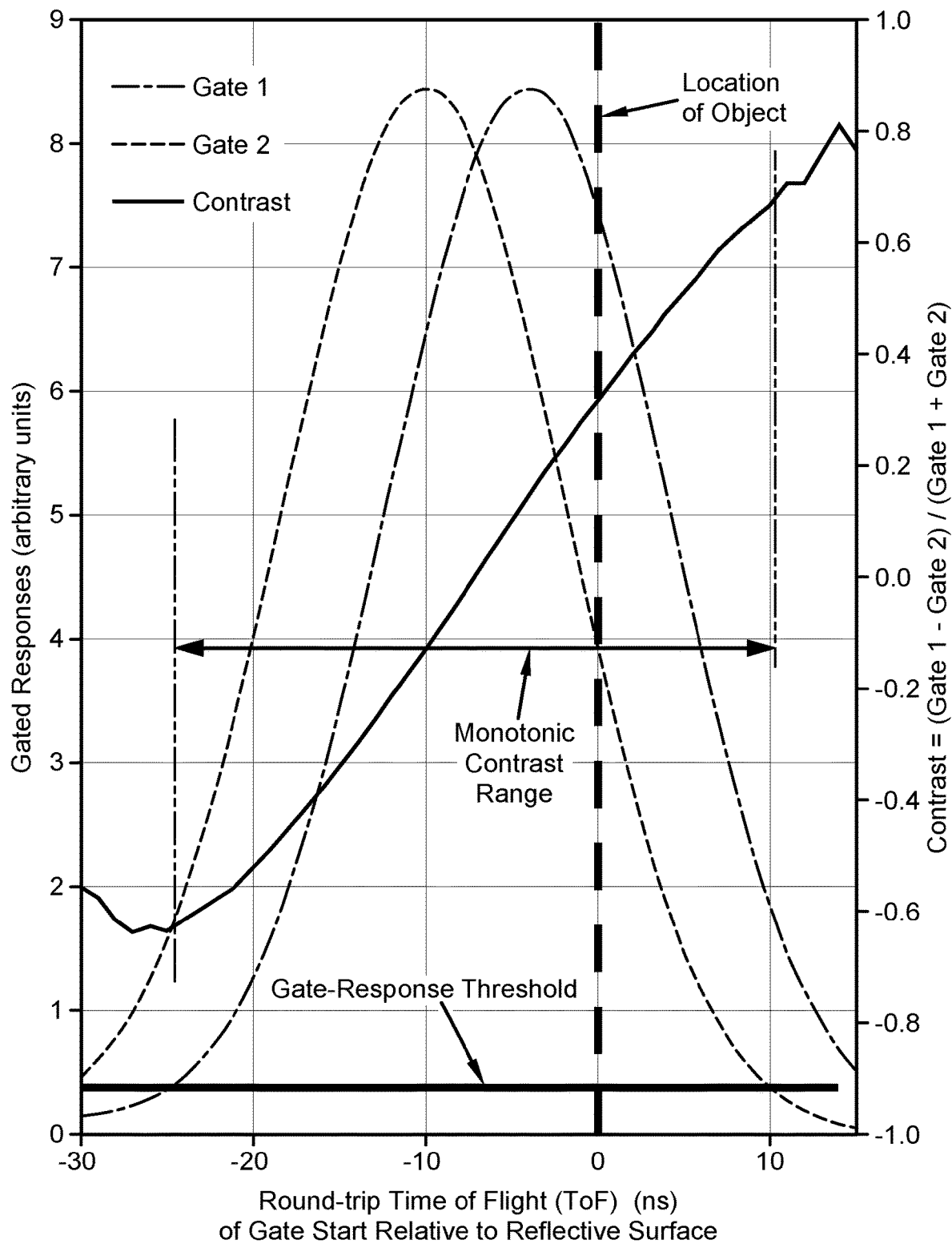
FIG. 8B is a graph representing the gated response of a first laser beam pulse and a second laser beam pulse utilized in the present disclosure, together with the contrast between the first and second response.

FIG. 8B shows the same example, but with the ratio of responses replaced by the contrast between the responses, with contrast defined as: Contrast=(Gate1−Gate2 response)/(Gate1+Gate2 response). Both the ratio and the contrast depend strongly on distance to the reflective surface, and much less on the reflectance of the surface.

As shown in FIG. 8A, the first gate 90 and the second gate 92 are offset from each other in delay time, typically by one-half of the nominal gate width, though other non-zero offsets may be used, up to the full duration of a gate. Delay time is the duration between the time a laser pulse is emitted, and the time at which a gate is turned on to collect reflected light. Due to the finite speed of light, delay time corresponds to the distance to where the gate starts. As shown in the graph of FIG. 8A, since there is delay in timing, the portions of the response that are most strongly on the object, namely, the peaks of the first gate curve and the second curve, are also offset from each other, so that when the ratio of the curves is obtained, there is a significant range over which the ratio is monotonic versus Gate 1 delay. Stated otherwise, the ratio is proportional to the range over the monotonic region. The ratio curve is the range versus ratio curve for calibrating range versus ratio of the two images. The ratio is monotonic only in the gate-overlap region defined by the response both being bright enough, represented in FIG. 8A by a horizontal line showing a threshold in the gated responses. The threshold is chosen so that, when both responses exceed the threshold, there is enough signal to compute a range-from-ratio LUT, or a range-from-contrast LUT, or both LUTs. The threshold may also be adjusted to accommodate system noise or water backscatter interference The ratio line indicates that there is a monotonic relationship over about 35 nanoseconds between range and ratio in tis example. The algorithm takes the corrected images and divides one by another. This is the ratio of one image divided by another. The ratio of the two images, because they have been offset, is proportional to the range to target. The more linear this proportionality is, the easier it is to determine how far away things are. If it is not linear, then it is still able to be utilized via a look-up table (LUT) that gives the distance to the reflective surface for any value of the gate-response ratio. The LUT can be in the form of a numerical table or a continuous-function fit, such as a linear function or a polynomial. Similarly, FIG. 8b shows that the contrast also has a monotonic portion such that range is proportional to contrast, and for which a LUT can be computed.

If the image includes a bad pixel or a bad pixel map, these will be corrected. If there is dark noise that varies, the dark noise must be subtracted. Further, the gain may vary from pixel to pixel that needs flattened. Thus, the processing for each camera is to obtain the raw data, subtract the darks and divide by the flats. Then, black out the bad pixels. Then heel in the bad pixels with some heeling algorithms. This is performed for both pictures. Then, the ratio of the first picture to the second picture is obtained with a check to determine that both pictures are bright enough to use. If the ratio of the first image and the second image is linear over a period of time, then, report 3D ranges for those parts of the image that are bright enough to do 3D ranging.

It will normally be the case that the water background is so dark that the range to the background is inconsequential and only the target object is of consequence for the 3D ranging. In very turbid water, the water background may be non-negligible, so that the gated-response threshold for computing range will be higher than in very clear water.

With continued reference to the operation of the system of the present disclosure, to select the best delays for system 10 computations, proceed as follows: 1. Measure and plot a gain profile; 2. Convert the target height h to delay time t through t=(2nh/c), where n is the index of refraction, and c is the speed of light in vacuum; 3. Find the point of maximum slope for each ramp, and center an interval of width t around this point; and 4. If the gain profile was measured at the furthest distance of the target, then use the end of each interval that has the shortest delay time.

For Gate Profile Generation, the following sequence of data processing steps assumes knowledge of how to choose the correct time values for the gate profile for the laser. In addition, depending on the environment, one can choose a 10 ns, 15 ns, or 20 ns laser pulse width. For shallow water it is desirable to use the shortest pulse width possible that produces monotonic ratio or contrast LUTs Most of the experiments used a pulse width of 15 ns, which corresponds to a gate thickness of 7.5 feet in air, and 5.6 feet in water.

In one example the system collected 100 frames per time slice, therefore each raw file contains 100 frames sampled at 30 Hz. Typical time values used for the laboratory setup were in the range of 50-70 ns, with samples taken at 1 ns intervals. To create a plot of the Gate Profile over time, a region of interest within the frame was chosen, typically a small rectangle within the center of the image frame. The gate profile across different regions of the image are not identical. Therefore a ROI representative of the target and at a similar field of depth was selected. The Gate Profiles were created in Excel.

Because the gate profile is used as the empirical calibration data for producing a range map, this data should be as accurate as possible. This means imaging points in time spanning 35-45 ns to produce a gate profile curve.

For ratio image file generation, once the gate profile is calculated the next step is to average each of the 100 frames in each data file into a single image. Then the average image from the "down" portion of the gate profile is divided by the average image from the "up" portion of the gate profile. This stage requires some experience on selecting the best image pairs that will create the optimal 3D image. In general, if there are 5 images on the up ramp and 5 images collected on the down ramp, there are 5*5=25 possible pairings of up/down images. Of these 25 image ratio combinations some combinations will produce better results with regard to noise, illumination, and SNR.

For distance calibrated relief image generation, the next step in the processing is to convert the best ratio image products created in the ratio image file generation stem into distance (which may be any unit, but for these examples, centimeters was chosen). The interpolation of ratio-to-distance values is calculated in situ by calibration imagery taken at the beginning of the field exercise and the known water depth. The initial conversion proved to be too noisy to handle effectively, and therefore was spatially smoothed using a contra-harmonic mean filter. The filters were implemented with the MATLAB function ordfilt2, a 2-D order-statistic filtering function. Once the distance calibrated image is spatially filtered, the surface function in MATLAB can be used to create 3D surfaces with this 2D matrix.

For a one camera setup, the first data collects in the program utilized only one camera (receiver) in the set-up, using two sequential images for the 3-dimensional images can be created using a "gate profile" function to create a relationship between intensity ratio and distance. The intensity ratio is the ratio between two co-located pixels imaged at different times. This output distance, or relief, corresponds to a 3D shape of the scene. The returning light from a scene is a convolution between the laser pulse, the scene reflectance, and the gain profile of the camera intensifier. To create this distance map of an object or scene, what is needed is: 1) a gate profile, and 2) two images from within this gate profile time range.

In a one camera setup, the camera needs to be sufficiently fast to allow for the ability to rapidly sample an underwater scene, with two images sampled within a few nanoseconds. This rapid sampling allows the system to operate even in the presence of turbulence and distortions on the water surface. Essentially one "up ramp" image is collected by the one camera at a first time, and one "downramp" image is collected by the second camera at a second time only a few nanoseconds later using the two rapid laser pulses registered to each image capture.

Figure 9:
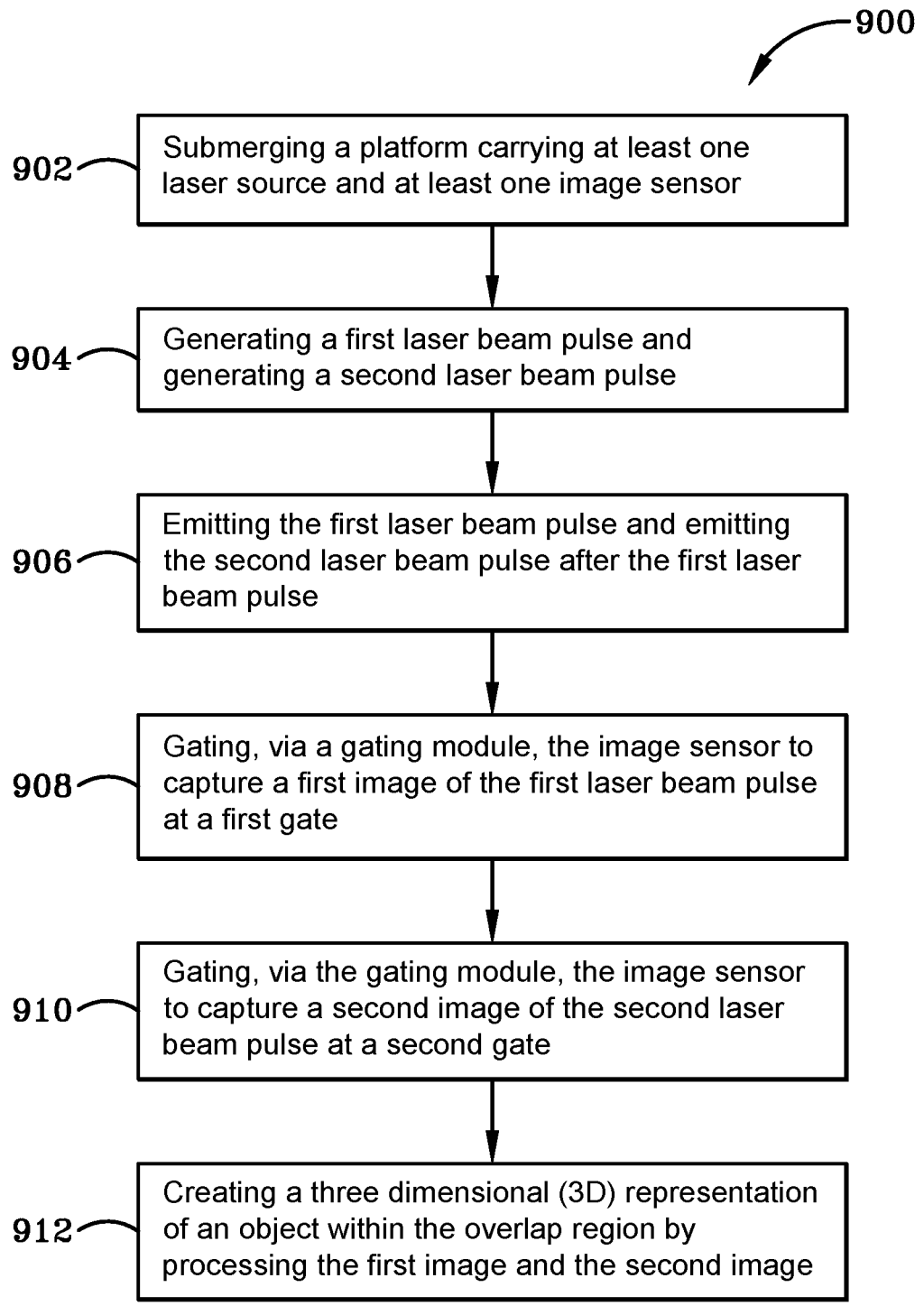
FIG. 9 is a flow chart depicting an exemplary method according to another exemplary embodiment of the present disclosure.

Having thus described the operation of system 10, the aforementioned exemplary methods, steps, or process may be incorporated into the method 900 depicted in FIG. 9. Method 900 may submerging a platform carrying at least one laser source and at least one image sensor, which is shown generally at 902. Method 900 may further include generating a first laser beam pulse and generating a second laser beam pulse, which is shown generally at 904. Method 900 may further include emitting the first laser beam pulse and emitting the second laser beam pulse after the first laser beam pulse, which is shown generally at 906. Method 900 may further include gating, via a gating module, the image sensor to capture a first image of the first laser beam pulse at a first gate, which is shown generally at 908. Method 900 may further include gating, via the gating module, the image sensor to capture a second image of the second laser beam pulse at a second gate, which is shown generally at 910, wherein the second gate and the first gate define an overlap region. Method 900 may further include creating a three dimensional (3D) representation of an object within the overlap region by processing the first image and the second image, which is shown generally at 912.

As described herein, one particular embodiment of method 900 provides that the image sensor is a particle image velocimetry (PIV) camera; and sequentially transmitting, via instructions from the gating module, the first laser beam pulse and the second laser beam pulse for the PIV to capture the first image at the first gate and the second image at the second gate; wherein the first and second images are at the two different times. Additionally, method 900 may include defining a laser beam pulse differential period in a range from 1 microsecond to about 10 microseconds, wherein the first laser beam pulse is transmitted at a first time in the pulse differential period and the second laser beam pulse is transmitted at a second time in the pulse differential period. Additionally, method 900 may include transmitting the 3D representation of the object at a transmission rate in a range from 1 Mbps to about 12 Mbps from a processor on the submersible platform to a control unit, wherein the control unit is remotely connected to the submersible platform via a tether.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An underwater imaging system, the imaging system comprising:
a first laser source to generate a first laser beam pulse, and a second laser beam pulse generated by one of (i) the first laser source and (ii) a second laser source, wherein the first and second laser beams are generated underwater, and the first laser source is adapted to be carried by a submersible platform;
a gating module in operative communication with the first and second laser beam pulses to create a first gate and a second gate, wherein the first gate overlaps the second gate to define an overlap region;
an image sensor in operative communication with the gating module to capture a first image irradiated by the first laser beam pulse at the first gate and a second image irradiated by the second laser beam pulse at the second gate, wherein the image sensor is adapted to be carried by the submersible platform;
a processor to determine whether an object irradiated by one or both of the first laser beam pulse and the second laser beam pulse is within the overlap region and generate a three dimensional (3D) representation of the object in the overlap region; and
wherein the gating module effectuates sequential transmission the first laser beam pulse and the second laser beam pulse for the image sensor to capture the first image at the first gate and the second image at the second gate; wherein the first and second images are at the two different times.

2. The underwater imaging system of claim 1, wherein the image sensor is a particle image velocimetry (PIV) camera.

3. The underwater imaging system of claim 1, further comprising:
a laser beam pulse differential period of time, wherein the first laser beam pulse is transmitted at a first time in the laser beam pulse differential period of time and the second laser beam pulse is transmitted at a second time in the laser beam pulse differential period of time, wherein the laser beam pulse differential period of time is in a range from 1 microsecond to about 10 microseconds.

4. The underwater imaging system of claim 3, further comprising:
a gated operative connection of the image sensor to the first laser source and the source of the second laser beam pulse that is configured to frame when the first laser source transmits the first laser beam pulses and frames again when the second laser beam pulse is transmitted.

5. The underwater imaging system of claim 1, further comprising:
a transmission rate of the 3D representation of the object from the processor, wherein the transmission rate is in a range from 1 Mbps to about 12 Mbps.

6. The underwater imaging system of claim 1, further comprising:
a first gate distance from 1 meter (m) to 3 m from the image sensor; and
a second gate distance from 2 m to 4 m from the image sensor; wherein the overlap region is from 2 m to 3 m from the image sensor.

7. The underwater imaging system of claim 1, further comprising:
3D imaging logic to generate a 3D representation in a video data stream at a video data rate based on the high-speed capture of images from the image sensor.

8. The underwater imaging system of claim 1, further comprising:
a field of view for the image sensor that is greater than 45 degrees.

9. The underwater imaging system of claim 8, wherein the field of view for the image sensor is about 80 degrees.

10. The underwater imaging system of claim 1, further comprising:
a hemispherical dome having a radius of curvature that centers an effective focal plane on an effective origin of the first and second laser beam pulses to not distort the first and second laser beam pulses or the image sensor.

11. The underwater imaging system of claim 1, wherein the processor is on the submersible platform to transmit the 3D representation to the control unit at a video data rate.

12. The underwater imaging system of claim 1, further comprising:
an image intensifier coupled to the image sensor, wherein the image intensifier is in electrical communication with the gating module to control exposure time of the image sensor, wherein operation of the image intensifier to control exposure time of the sensor is independent from a different exposure control within the image sensor.

13. The underwater imaging system of claim 1, further comprising:
relay optics that define coupler to couple the image intensifier with a focal plane array of the image sensor.

14. The underwater imaging system of claim 1, further comprising;
a range-gated Lidar that registers all pixels simultaneously adapted to use a temporal shape of a gated-image sensor non-linear response curve, wherein the first image and the second images are collected to place the object at different places on the response curve and processed to separate reflectance from range and render an image of ranges to the object across a subsequent image.

15. The underwater imaging system of claim 1, further comprising:
a beam former carried by the submersible platform, wherein the first laser beam and the second laser beam sequentially exit the submersible platform through the beam former.

16. A method comprising:
submerging a platform carrying at least one laser source and at least one image sensor;
generating a first laser beam pulse and generating a second laser beam pulse;
emitting the first laser beam pulse and emitting the second laser beam pulse after the first laser beam pulse;
gating, via a gating module, the image sensor to capture a first image of the first laser beam pulse at a first gate;
gating, via the gating module, the image sensor to capture a second image of the second laser beam pulse at a second gate; wherein the second gate and the first gate define an overlap region;
creating a three dimensional (3D) representation of an object within the overlap region by processing the first image and the second image; and
wherein the image sensor is a particle image velocimetry (PIV) camera; and
sequentially transmitting, via instructions from the gating module, the first laser beam pulse and the second laser beam pulse for the PIV to capture the first image at the first gate and the second image at the second gate; wherein the first and second images are at the two different times.

17. The method claim 16, further comprising:
defining a laser beam pulse differential period in a range from 1 microsecond to about 10 microseconds, wherein the first laser beam pulse is transmitted at a first time in the pulse differential period and the second laser beam pulse is transmitted at a second time in the pulse differential period.

18. The method of claim 17, further comprising:
transmitting the 3D representation of the object at a transmission rate in a range from 1 Mbps to about 12 Mbps from a processor on the submersible platform to a control unit, wherein the control unit is remotely connected to the submersible platform via a tether.

* * * * *